(12) United States Patent
Hill, IV

(10) Patent No.: US 12,330,813 B1
(45) Date of Patent: Jun. 17, 2025

(54) METHODS AND APPARATUS FOR MULTI-AXIS DETERMINANT ASSEMBLY CONTROL

(71) Applicant: The Boeing Company, Arlington, VA (US)

(72) Inventor: Chester James Hill, IV, Grafton, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/656,185

(22) Filed: May 6, 2024

(51) Int. Cl.
*B64F 5/10* (2017.01)
*B25B 1/22* (2006.01)
*B25B 1/24* (2006.01)
*B25B 11/00* (2006.01)
*B64C 1/12* (2006.01)

(52) U.S. Cl.
CPC ................ *B64F 5/10* (2017.01); *B25B 11/00* (2013.01); *B23P 2700/01* (2013.01); *B25B 1/22* (2013.01); *B25B 1/2484* (2013.01); *B64C 1/12* (2013.01)

(58) Field of Classification Search
CPC .................... B25B 1/22; B25B 1/2484; B25B 11/00–11/005; B25B 11/02; B64F 5/10; B64F 5/50; B23P 2700/01
See application file for complete search history.

(56) References Cited

U.S. PATENT DOCUMENTS

| 5,848,783 A | * | 12/1998 | Weissenborn | ............ B25B 5/14 269/236 |
| 2022/0161375 A1 | * | 5/2022 | Sarbalkan | ............... B25B 11/00 |
| 2023/0294252 A1 | * | 9/2023 | Harriman | .............. B25B 11/002 269/8 |

* cited by examiner

*Primary Examiner* — Matthew P Travers
(74) *Attorney, Agent, or Firm* — Hanley, Flight & Zimmerman, LLC

(57) ABSTRACT

Methods and apparatus for multi-axis determinant assembly adjustment are disclosed. A disclosed example apparatus includes a base mounted to an assembly jig, a support having an interface surface to support a portion of a panel component, a pin to rotationally couple the support to the base, the support to rotate relative to the base about an axis of rotation of the pin, and an adjuster to cause translation of the pin along a slot of the base to move the support.

18 Claims, 6 Drawing Sheets

METHODS AND APPARATUS FOR MULTI-AXIS DETERMINANT ASSEMBLY CONTROL

FIELD OF THE DISCLOSURE

This disclosure relates generally to tooling/manufacturing and, more particularly, to methods and apparatus for multi-axis determinant assembly control.

BACKGROUND

For aircraft applications, parts and/or components can have a significant weight, as well as size. For example, aircraft panels, such as those utilized in fuselage or wing sections, can be relatively large such that portions thereof can displace relative to another based on a weight distribution and a manner in which the panels are handled and/or constrained.

SUMMARY

An example apparatus includes a base mounted to an assembly jig, a support having an interface surface to support a portion of a panel component, a pin to rotationally couple the support to the base, the support to rotate relative to the base about an axis of rotation of the pin, and an adjuster to cause translation of the pin along a slot of the base to translate the support.

An example system to support an elongate frame component for determinant assembly thereof includes first and second supports spaced apart from one another, and including first and second contact surfaces, respectively, to support the elongate frame component, at least one base from which the first and second supports extend, a first pin to rotatably couple the first support to the at least one base, a second pin to rotatably couple the second support to the at least one base, a rotational adjuster to adjust a rotational orientation of at least one of the first support about the first pin or the second support about the second pin, and a translational adjuster to translationally move at least one of the first or second pins.

An example method for determinant assembly of a frame component includes placing a first portion of a vehicle panel at a first support, the first support having a first axis of rotation defined by a first pin, placing a second portion of the vehicle panel at a second support spaced apart from the first support, the second support having an axis of rotation defined by a second pin, and adjusting a translational position of at least one of the first pin or the second pin to reduce forces imparted to the frame component.

Figure 1:
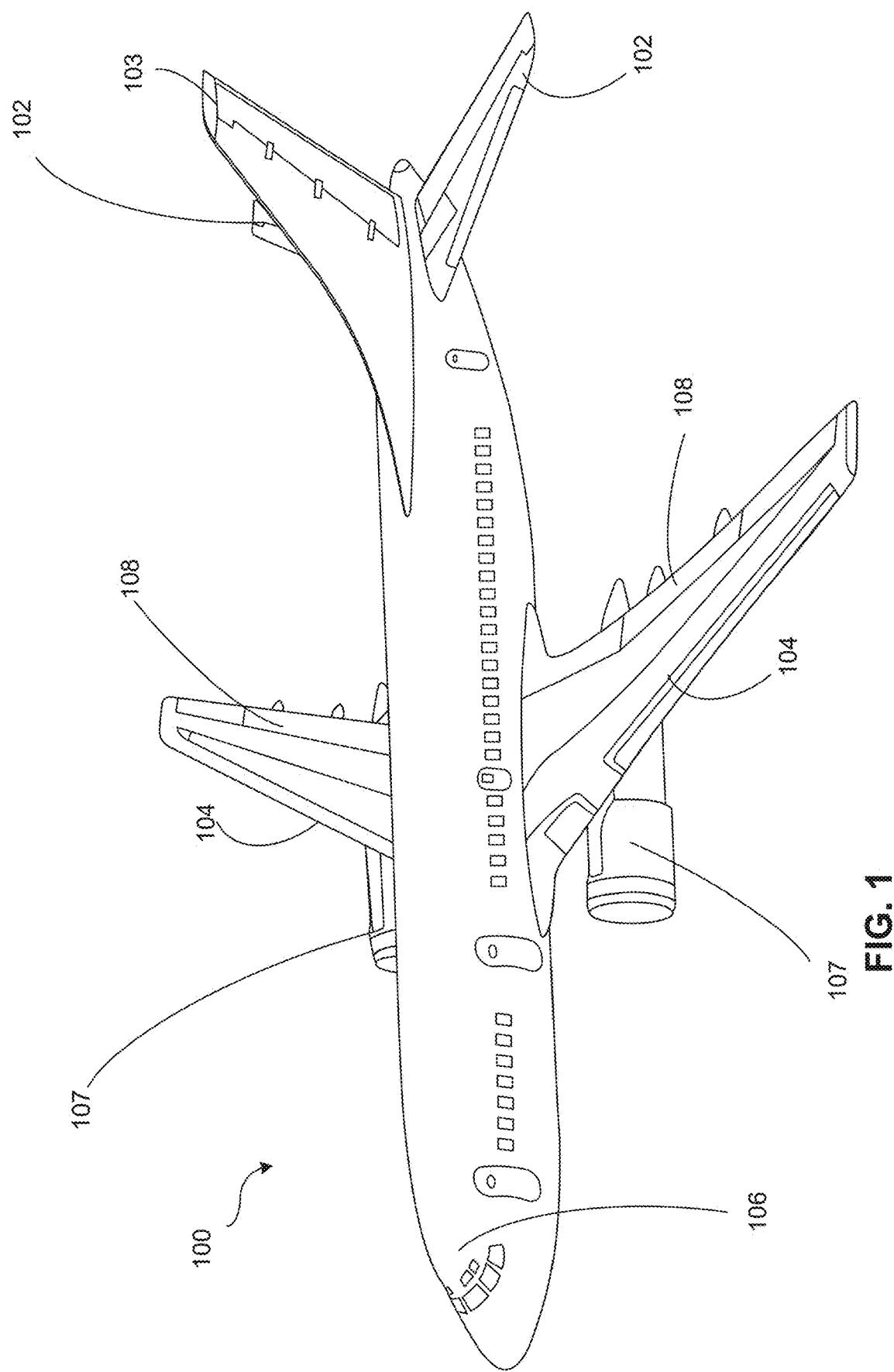
FIG. 1 illustrates an example aircraft in which examples disclosed herein can be utilized for the manufacture thereof.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for multi-axis determinant assembly control are disclosed. In manufacturing environments, handling of a large component in combination with its weight distribution can cause the component to warp and/or displace under the influence of different forces including, but not limited to, gravity. For example, an aircraft fuselage or wing panel can bend, warp and/or twist based on a distribution of weight over a significant distance. As a result, the panel can misalign to another component, such as a frame component and/or assembly. In turn, features of the panel can be difficult to align with corresponding features of the other component and, thus, assembly and/or handling thereof can be difficult. As a result, the component may necessitate reworking or even end up being rejected, thereby resulting in an increased repair and/or rework time, for example.

Examples disclosed herein are effective in precisely controlling support of components, such as skin panels. Examples disclosed herein can facilitate adjustment of the components along multiple directions and/or axes. While examples disclosed herein are described in the context of aircraft, examples disclosed herein can be applied to any other appropriate type of assembly and/or structure that is stationary or can move.

Examples disclosed herein including multiple positioning elements (e.g., rotational positioning elements) that utilize a base mounted to an assembly jig such that the base carries a support having an interface surface (e.g., a relatively flat interface surface, a contact surface, etc.) to support a portion of a panel component (e.g., a panel, a frame, an elongate frame, a frame component, etc.), such as a vehicle panel component or a skin panel component, for example. While the examples describe support of a panel component such as a skin panel, it should be understood that the panel component may be an elongate workpiece, plate, panel or other structure having a plurality of holes for fastening the panel component to a frame structure.

According to examples disclosed herein, the aforementioned support is rotationally coupled to the base with a pin supported by a body (e.g., a housing, a component, etc.). An example displacer is implemented to translate the pin to control a distribution of forces imparted to the panel component, move/orient the panel component and/or adjust support of the panel component. As a result, processing and/or assembly of components to the panel component can be greatly facilitated.

In some examples, the pin is translatable within a slot of the base. In some such examples, the pin can be translated in a transverse direction to an axis of rotation of the aforementioned pin. In some examples, a rod is threadably coupled to a collar such that movement of the rod displaces the pin via the collar. According to examples disclosed herein, rotational axes of the supports are generally aligned and/or parallel relative to one another. In some examples, the translational direction of movement of the supports may be generally aligned and/or parallel relative to one another. In some examples, the support surface includes a compressible material and/or pad.

As used herein, the terms "slot," "slotted," "slotted opening" or "a slotted interface" refer to a fit in which a first component has an intended linear clearance relative to a second component such that the second component can move, rotate and/or translate in a controlled manner relative to the first component. As used herein, the term "adjuster" refers to a device, component and/or assembly to cause or translate movement of an object.

FIG. 1 illustrates an example aircraft 100 in which examples disclosed herein can be implemented. In particular, examples disclosed herein can be utilized to produce components and/or parts associated with the aircraft 100, for example. In the illustrated example of FIG. 1, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

In the illustrated example of FIG. 1, internal components and/or assemblies are located in the fuselage 106 (and other external components) of the aircraft 100. Examples disclosed herein can be applied to any appropriate internal or external structure and/or vehicle. Accordingly, examples disclosed herein can be utilized for rotorcraft, spacecraft, watercraft, submersibles, unmanned aerial vehicles, or stationary structures, etc. Examples disclosed herein can be utilized for any appropriate structure that necessitates support (e.g., the structure is affected by gravity and/or distortions caused by gravity). In a particular scenario, examples disclosed herein can effectively support a panel or skin of the fuselage 106 and can reduce warpage and/or distortion thereof to facilitate assembly of frame components thereto.

Figure 2A:
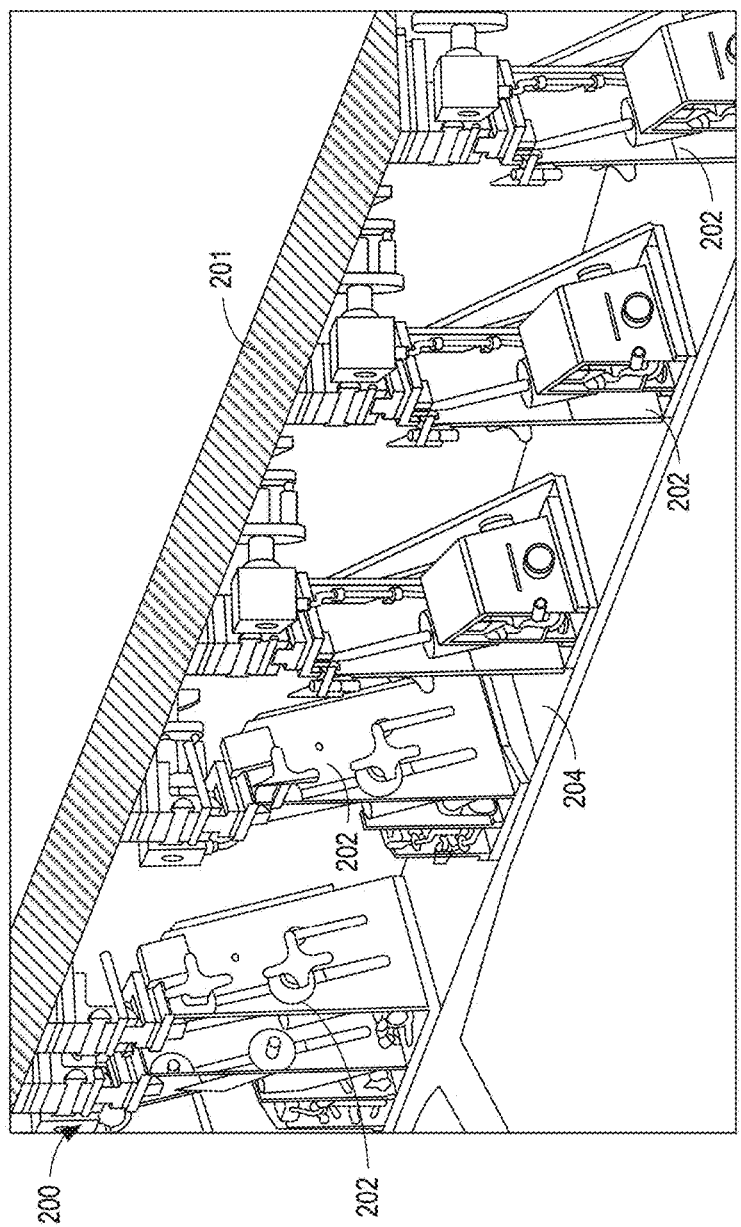
FIGS. 2A and 2B illustrate an example support system in accordance with teachings of this disclosure.
Figure 2B:
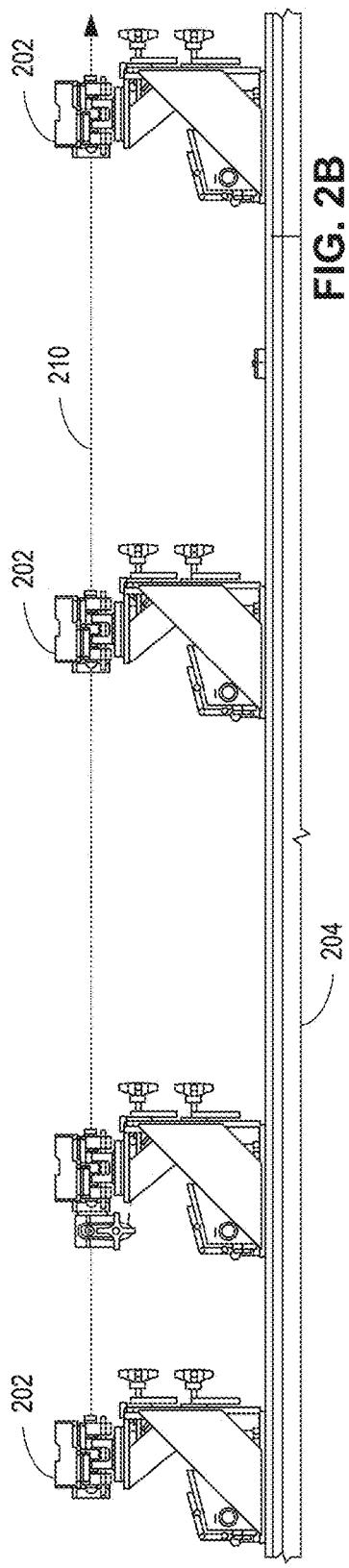

FIGS. 2A and 2B illustrate an example support system 200 in accordance with teachings of this disclosure. Turning to FIG. 2A, the example support system 200 is shown with a workpiece (e.g., a panel component, a panel, a frame, an elongate frame, an elongate frame member, a skin, etc.) 201. The support system 200 of the illustrated example includes a plurality of positioning elements (e.g., support frame elements, support elements, etc.) 202 that are mounted to a base 204. In this example, the base 204 is generally rigid and part of and/or integral with an assembly jig utilized for assembly of subcomponents to the workpiece 201.

FIG. 2B depicts a frontal view of the example support system 200. In the illustrated example of FIG. 2B, multiples ones of the positioning elements (e.g., support elements, support frames, distributed supports, etc.) 202 are shown spaced apart from another while being supported by the base. In particular, the positioning elements 202 are generally aligned and/or oriented along an axis 210 and into/out of the page. In other examples, the positioning elements 202 are not aligned along an axis (e.g., the positioning elements 202 are arranged across a planar surface with non-parallel axes of rotation). According to some examples disclosed herein, the positioning elements 202 can be positioned relative to one another along the axis 210 at load bearing positions/paths for a workpiece supported by the support system 200. To that end, examples disclosed herein can effectively support the workpiece as additional components are added to increase a weight.

In operation, the example support system 200 is utilized to rotate the workpiece 201 for subsequent manufacturing and/or assembly processes. For example, interface surfaces (e.g., contact surfaces) of the positioning elements 202 can be rotated (e.g., in unison) to move the workpiece 201 for assembly and/or processing thereto. According to some examples disclosed herein, actuators (e.g., motors, transducers) of the positioning elements 202 are operated (e.g., operated in a coordinated manner) to turn the workpiece 201 and the positioning elements 202 are adjusted to mitigate and/or avoid unintended flexure and/or warpage of the workpiece 201. As will be discussed in greater detail below in connection with FIGS. 3-6, examples disclosed herein enable one or more of the positioning elements 202 to advantageously be adjusted to control (e.g., reduce) forces imparted to the workpiece 201, thereby reducing a likelihood that the workpiece 201 will have to be reworked or rejected in further assembly and/or manufacturing processing and, thus, reducing manufacturing, reworking as well as labor costs often experienced with components/systems. Examples disclosed herein can be utilized for components that necessitate non-contiguous support/retention and indexing for the purposes of load distribution, distortion prevention and/or part placement within an assembly.

Figure 3:
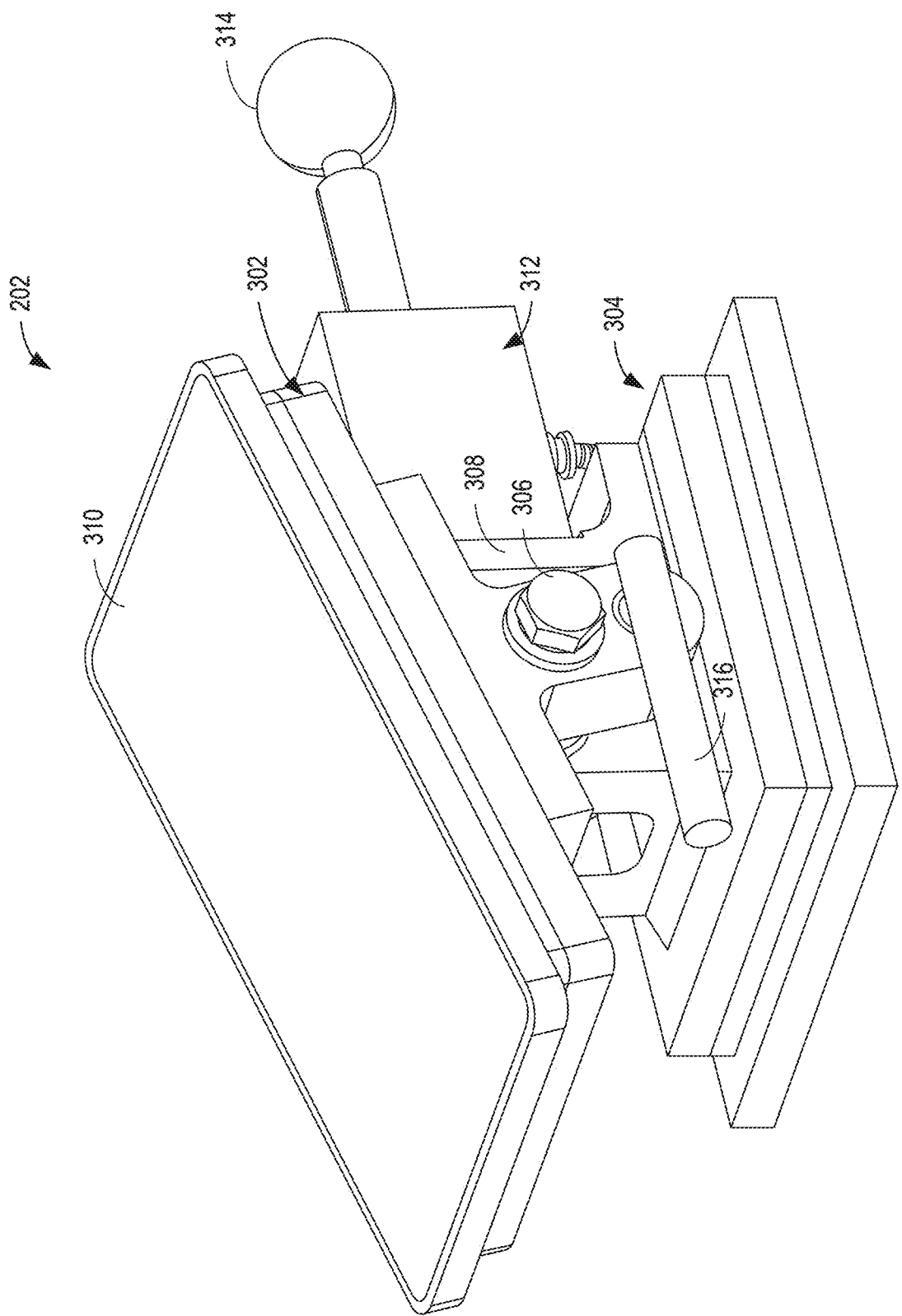
FIG. 3 depicts an example positioning element in accordance with teachings of this disclosure.

FIG. 3 depicts the example positioning element 202 in accordance with teachings of this disclosure. According to the illustrated example, the positioning element 202 includes a support 302 that is rotationally coupled to a base (e.g., a body) 304 via a pin 306, thereby defining a rotational interface (e.g., rotational joint, a rotational coupling, etc.) or pivot therebetween. In other words, a pivot and/or pivot interface defined by the pin 306, and the support 302 defines a rotational adjuster for the support 302. In this example, the base 304 further includes a structural element 308 (e.g., a base support) that positions and aligns the pin 306. The support 302 of the illustrated example also includes an interface support surface/pad (e.g., a compressible pad) 310 to support and/or carry a portion of the workpiece 201 shown in FIG. 2A. In this example, an adjuster (e.g., a displacer, a translational adjuster, etc.) 312 is shown with an adjustment knob 314.

To control support of a workpiece, such as an aircraft panel, for example, the example support 302 and, in turn, the interface surface/pad 310 can be rotated about an axis of rotation of the pin 306 by moving a lever 316. Further, the pin 306 can be translated by the adjuster 312 in a direction that is transverse, orthogonal and/or perpendicular (e.g., within 5 degrees of the orthogonal/perpendicular direction) to the axis of rotation of the pin 306. In other words, the support 302 holding the workpiece can be independently adjusted for each of the positioning elements 202.

Figure 4:
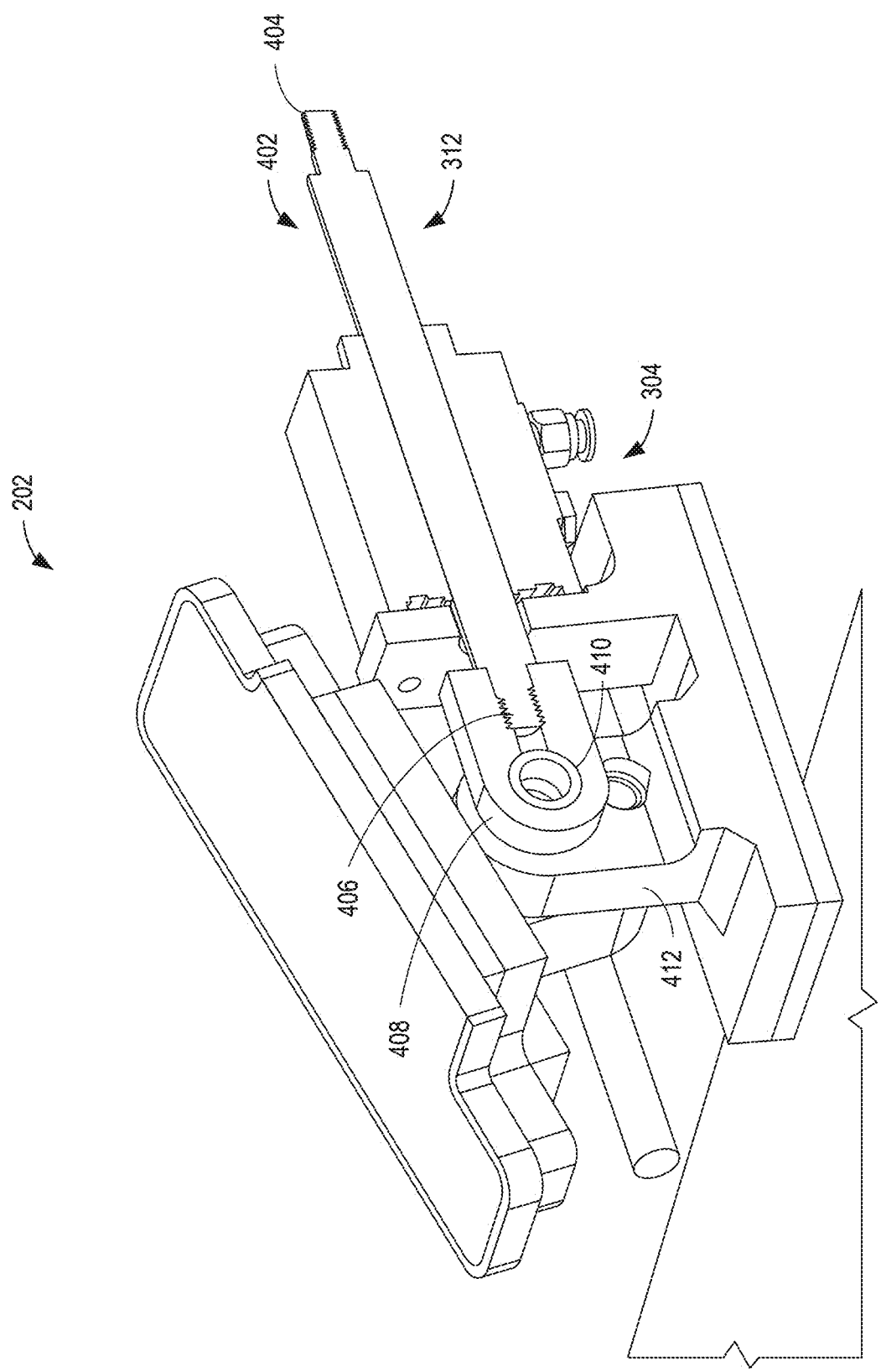
FIGS. 4 and 5 are cross-sectional cutaway views of the example positioning element of FIG. 3.
Figure 5:
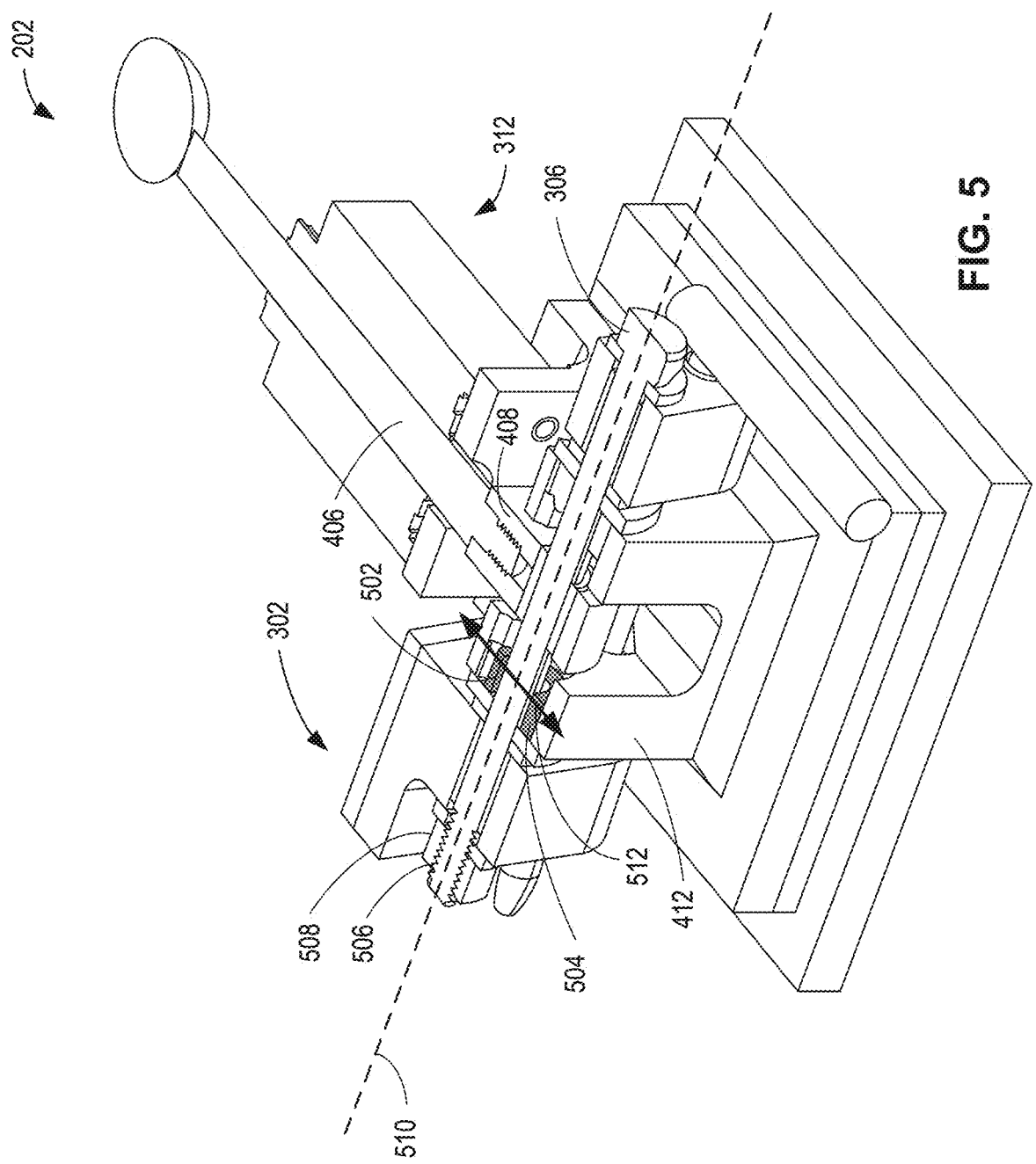

FIGS. 4 and 5 are cross-sectional cutaway views of the positioning element 202 of FIGS. 2A-3. Turning to FIG. 4, the example support 302 is depicted with a portion of the adjuster 312 hidden for clarity. In the illustrated example of FIG. 4, the adjuster 312 includes a rod 402 with a first threaded end 404 and a second threaded end 406. Further, the second threaded end 406 is coupled to (e.g., threadably coupled to) a collar 408 in which a bushing 410 is mounted. In this example, a tab (e.g., an ear) 412 of the base 304 supports, positions and aligns the bushing 410 which, in turn, receives the pin 306 shown in FIG. 3. In this example, the tab 412 defines and/or includes a component, such as a bushing, that defines a slotted interface to the aforementioned pin 306.

FIG. 5 is a cutaway cross-sectional view of the positioning element 202 shown in FIGS. 2A-4. The view of FIG. 5 is shown along a cut that is orthogonal to that shown in FIG. 4. In the illustrated view of FIG. 5, the example adjuster 312 is shown in conjunction with the pin 306. According to examples disclosed herein, the tab 412 supports and/or positions a bushing 502 with an aperture 504 thereof. In particular, the bushing 502 defines a slotted interface and/or aperture to receive at least a portion of the pin 306. Further, a threaded portion and/or end 506 of the pin 306 is threaded into a nut fastener 508. In this example, the support 302 can rotate about an axis of rotation 510 of the pin 306.

To translate and/or translationally move the pin 306 and, thus, move and/or displace the support 310 shown in FIGS. 3 and 4, the adjuster 312 of the illustrated example is moved (e.g., pushed/pulled, rotated, etc.) by a user or operator, thereby causing the threaded end 406 to move the collar 408 and, thus, displace the pin 306 along a direction generally indicated by a double arrow 512 with respect to the slotted interface and/or aperture of the bushing 502. In some examples, the positioning element 202 can be adjusted to reduce stresses and/or distortions imparted to a workpiece, such as an aircraft panel, for example.

Figure 6:
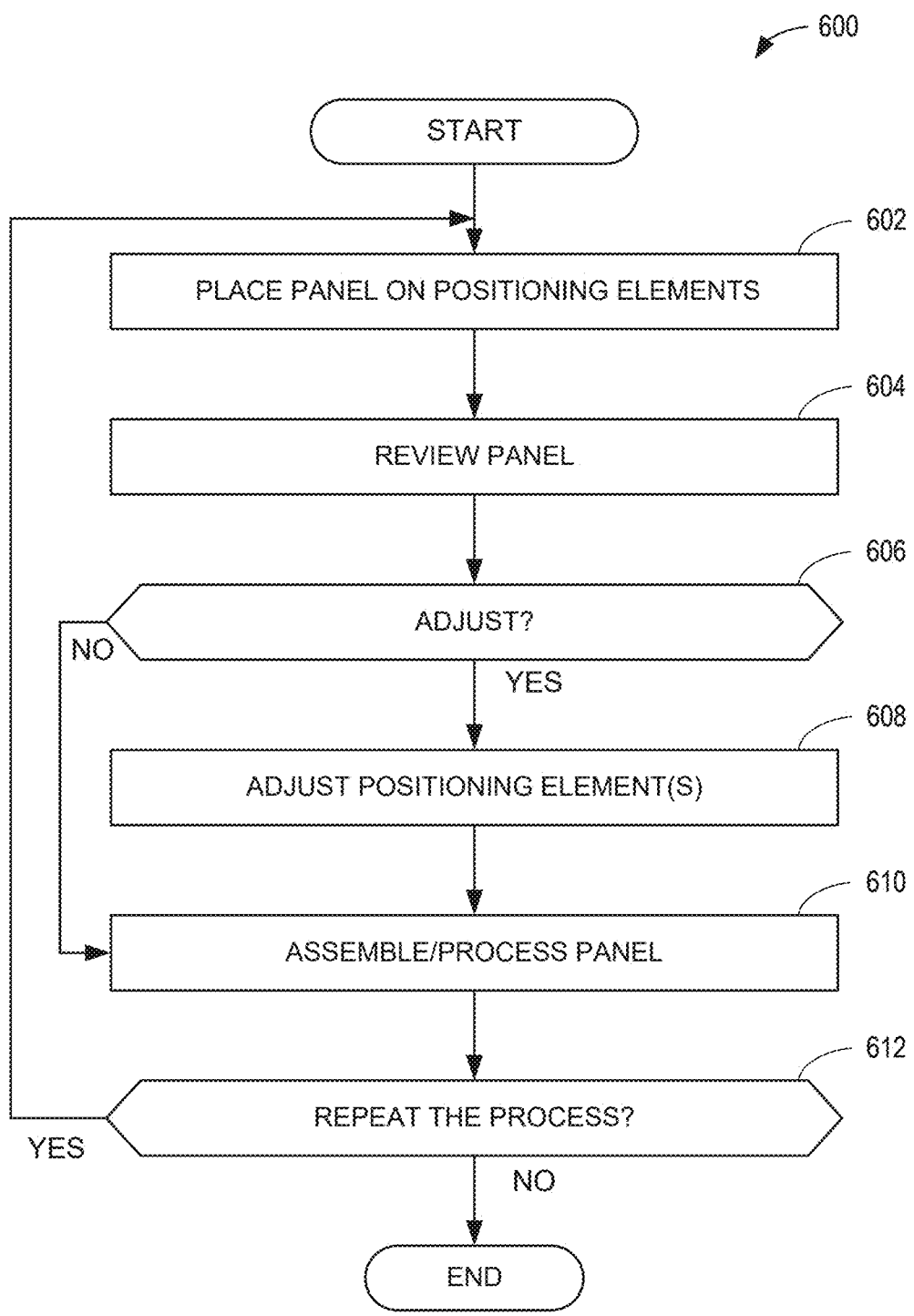
FIG. 6 is a flowchart representative of an example method in accordance with teachings of this disclosure.

FIG. 6 is a flowchart representative of an example method 600 in accordance with teachings of this disclosure. The example method 600 begins as a component, which is an elongate aircraft panel (e.g., a fuselage panel, a skin panel, a wing panel, an aerodynamic body panel, etc.) in this example, is to be rotated for assembly of subcomponents thereto. In this example, subcomponents are to be assembled to the aircraft panel.

At block 602, the aforementioned aircraft panel is placed onto multiple positioning elements (e.g., the positioning elements 202). In particular, the aircraft panel is placed across multiple interface surfaces of the corresponding positioning elements. In this example, the positioning elements are oriented with rotational axes thereof being generally parallel (e.g., within 5 degrees) to one another. In other examples, the positioning elements are distributed across with non-parallel axes of rotation (e.g., placed in different areas of a two-dimensional plane where at least two of the positioning elements are not arranged along an axis and/or are not parallel).

At block 604, in some examples, the aircraft panel is reviewed and/or observed. In some such examples, the aircraft panel is reviewed for potential warpage and/or distortions.

At block 606, it is determined whether to adjust at least one positioning element. If at least one positioning element is to be adjusted (block 606), control of the process proceeds to block 608. Otherwise, the process proceeds to block 610.

At block 608, at least one of the positioning elements is adjusted. For example, a rotational pin of at least one of the positioning elements is translationally adjusted to displace an axis of rotation of a corresponding interface surface of a support.

At block 610, the aircraft panel is assembled and/or processed. In some examples, subcomponents such as subframe components, are assembled to the aircraft panel.

At block 612, it is determined whether to repeat the process. If the process is to be repeated (block 612), control of the process returns to block 604. Otherwise, the process ends. The determination may be based on whether additional components are to be assembled/processed to the aircraft panel and/or whether additional aircraft panels are to be assembled/processed, for example.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture to enable effective control and/or adjustment of supports for components for manufacturing are disclosed herein. Further examples and combinations thereof include the following:

Example 1 includes an apparatus comprising a base mounted to an assembly jig, a support having an interface surface to support a portion of a panel component, a pin to rotationally couple the support to the base, the support to rotate relative to the base about an axis of rotation of the pin, and an adjuster to cause translation of the pin along a slot of the base to translate the support.

Example 2 includes the apparatus as defined in example 1, wherein the adjuster includes a rod coupled to a collar, the collar to displace the pin in response to movement of the rod.

Example 3 includes the apparatus as defined in example 1, wherein the adjuster is to translate the pin in a transverse direction relative to the axis of rotation.

Example 4 includes the apparatus as defined in example 1, wherein the interface surface includes a compressible pad.

Example 5 includes the apparatus as defined in example 1, wherein the panel component includes an elongate frame member for an aircraft.

Example 6 includes the apparatus as defined in example 1, wherein the portion is a first portion, the support is a first support, the base is a first base and the interface surface is a first interface surface, and further including a second base mounted to the assembly jig, a second support having a second interface surface to support a second portion of the panel component, a second pin supported to rotationally couple the second support to the second base, the second support to rotate relative to the second base about a second axis of rotation of the second pin, and a second adjuster to cause translation of the second pin along a second slot of the second base to translate the second support.

Example 7 includes the apparatus as defined in example 6, wherein a movement of the first support or the second support is to cause a movement of the other of the first support or the second support via the panel component.

Example 8 includes a system to support an elongate frame component for determinant assembly thereof, the system comprising first and second supports spaced apart from one another, and including first and second contact surfaces, respectively, to support the elongate frame component, at least one base from which the first and second supports extend, a first pin to rotatably couple the first support to the at least one base, a second pin to rotatably couple the second support to the at least one base, a rotational adjuster to adjust a rotational orientation of at least one of the first support about the first pin or the second support about the second pin, and a translational adjuster to translationally move at least one of the first or second pins.

Example 9 includes the system as defined in example 8, further including an assembly jig coupled to the base.

Example 10 includes the system as defined in example 9, wherein the base is integral with the assembly jig.

Example 11 includes the system as defined in example 8, wherein the translational adjuster is a first translational adjuster, wherein the first pin to be translationally adjusted by the first translational adjuster, and further including a second translational adjuster to translationally adjust the second pin.

Example 12 includes the system as defined in example 8, wherein a movement of the first support or the second support is to cause a movement of the other of the first support or the second support via the elongate frame component.

Example 13 includes the system as defined in example 8 wherein the first pin extends parallel to the second pin.

Example 14 includes the system as defined in example 8, wherein the translational adjuster includes a rod to displace a collar, and wherein movement of the rod causes the collar to translate the at least one of the first or second pins.

Example 15 includes the system as defined in example 8, wherein the translational adjuster is to move the at least one of the first pin or the second pin in a direction transverse to a rotational axis of the first pin or the second pin.

Example 16 includes a method for determinant assembly of a frame component, the method comprising placing a first portion of a vehicle panel at a first support, the first support having a first axis of rotation defined by a first pin, placing a second portion of the vehicle panel at a second support spaced apart from the first support, the second support having an axis of rotation defined by a second pin, and adjusting a translational position of at least one of the first pin or the second pin.

Example 17 includes the method as defined in example 16, further including determining at least one of a flexure or distortion of the frame component, and wherein the adjustment of the position of the at least one of the first pin or the second pin is based on the determination.

Example 18 includes the method as defined in example 17, wherein the position of the at least one of the first pin or the second pin is based on the determination.

Example 19 includes the method as defined in example 16, wherein adjustment of the position of the at least one of the first or second pins includes moving at least one of the first pin in a first respective slot or moving the second pin in a second respective slot.

Example 20 includes the method as defined in example 16, wherein adjusting the position of the at least one of the first pin or the second pin includes moving a rod to displace a collar.

From the foregoing, it will be appreciated that example systems, apparatus, articles of manufacture, and methods have been disclosed that enable relatively quick and effective assembly of components that can otherwise be difficult to assemble. Examples disclosed herein can accurately control support of relatively large and/or heavy components that can be subject to bending and warpage, which can increase a difficulty of assembly of other components thereto. Examples disclosed herein can also reduce manufacturing time as well as rejected components and/or reworking typically associated with conventional manufacturing techniques.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   a base mounted to an assembly jig;
   a support having an interface surface to support a portion of a panel component;
   a pin to rotationally couple the support to the base, the support to rotate relative to the base about an axis of rotation of the pin; and
   an adjuster to cause translation of the pin along a slot of the base to move the support;
   wherein the adjuster includes a rod coupled to a collar, the collar to displace the pin in response to movement of the rod.

2. The apparatus as defined in claim 1, wherein the adjuster is to translate the pin in a transverse direction relative to the axis of rotation.

3. The apparatus as defined in claim 1, wherein the interface surface includes a compressible pad.

4. The apparatus as defined in claim 1, wherein the panel component includes an elongate frame member for an aircraft.

5. The apparatus as defined in claim 1, wherein the portion is a first portion, the support is a first support, the base is a first base and the interface surface is a first interface surface, and further including:
   a second base mounted to the assembly jig;
   a second support having a second interface surface to support a second portion of the panel component;
   a second pin supported to rotationally couple the second support to the second base, the second support to rotate relative to the second base about a second axis of rotation of the second pin; and
   a second adjuster to cause translation of the second pin along a second slot of the second base to move the second support.

6. The apparatus as defined in claim 5, wherein a movement of the first support or the second support is to cause a movement of the other of the first support or the second support via the panel component.

7. A system to support an elongate frame component for determinant assembly thereof, the system comprising:
   first and second supports spaced apart from one another, and including first and second contact surfaces, respectively, to support the elongate frame component;
   at least one base from which the first and second supports extend;
   a first pin to rotatably couple the first support to the at least one base;
   a second pin to rotatably couple the second support to the at least one base;
   a rotational adjuster to adjust a rotational orientation of at least one of the first support about the first pin or the second support about the second pin; and
   a translational adjuster to translationally move at least one of the first or second pins;
   wherein the translational adjuster includes a rod to displace a collar, and wherein movement of the rod causes the collar to translate the at least one of the first or second pins.

8. The system as defined in claim 7, further including an assembly jig coupled to the at least one base.

9. The system as defined in claim 7, wherein the at least one base is integral with the assembly jig.

10. The system as defined in claim 7, wherein the translational adjuster is a first translational adjuster, wherein the first pin to be translationally adjusted by the first translational adjuster, and further including a second translational adjuster to translationally adjust the second pin.

11. The system as defined in claim 7, wherein a movement of the first support or the second support is to cause a movement of the other of the first support or the second support via the elongate frame component.

12. The system as defined in claim 7 wherein the first pin extends parallel to the second pin.

13. The system as defined in claim 7, wherein the translational adjuster is to move the at least one of the first pin or the second pin in a direction transverse to a rotational axis of the first pin or the second pin.

14. A method for determinant assembly of a frame component using the system of claim 7, the method comprising:
   placing a first portion of a vehicle panel at the first support, the first support having a first axis of rotation defined by the first pin;
   placing a second portion of the vehicle panel at the second support, the second support having an axis of rotation defined by the second pin; and
   adjusting a translational position of at least one of the first pin or the second pin.

15. The method as defined in claim 14, further including determining at least one of a flexure or distortion of the frame component, and wherein the adjustment of the position of the at least one of the first pin or the second pin is based on the determination.

16. The method as defined in claim 15, wherein the position of the at least one of the first pin or the second pin is based on the determination.

17. The method as defined in claim 15, wherein adjustment of the position of the at least one of the first or second pins includes moving at least one of the first pin in a first respective slot or moving the second pin in a second respective slot.

18. The method as defined in claim 14, wherein adjusting the position of the at least one of the first pin or the second pin includes moving the rod to displace the collar.

* * * * *